United States Patent
Kamaraju

(10) Patent No.: US 11,987,158 B2
(45) Date of Patent: May 21, 2024

(54) ENERGY ABSORBING HEADREST FOR A VEHICLE

(71) Applicant: GM Global Technology Operations LLC, Detroit, MI (US)

(72) Inventor: Venkata Pavan K. Kamaraju, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 17/857,236

(22) Filed: Jul. 5, 2022

(65) Prior Publication Data
US 2024/0010113 A1    Jan. 11, 2024

(51) Int. Cl.
| | |
|---|---|
| B60N 2/42 | (2006.01) |
| B60N 2/427 | (2006.01) |
| B60N 2/838 | (2018.01) |
| B60N 2/888 | (2018.01) |
| B60R 21/055 | (2006.01) |

(52) U.S. Cl.
CPC ............. *B60N 2/888* (2018.02); *B60N 2/838* (2018.02)

(58) Field of Classification Search
CPC .......... B60N 2/888; B60N 2/838; B60N 2/80
See application file for complete search history.

(56) References Cited

U.S. PATENT DOCUMENTS

| | | | | |
|---|---|---|---|---|
| 5,669,668 A * | 9/1997 | Leuchtmann | .......... | B60N 2/874 403/325 |
| 6,129,421 A * | 10/2000 | Gilson | ................... | B60N 2/859 297/403 |
| 6,199,947 B1 * | 3/2001 | Wiklund | ................ | B60N 2/865 297/216.12 |
| 6,270,161 B1 * | 8/2001 | De Filippo | ............ | B60N 2/838 297/391 |
| 6,565,150 B2 | 5/2003 | Fischer | | |
| 6,962,392 B2 * | 11/2005 | O'Connor | .............. | B60N 2/888 297/408 |
| 7,393,052 B2 * | 7/2008 | Humer | ................. | B60N 2/4228 297/216.12 |
| 7,731,280 B2 | 6/2010 | Niitsuma | | |
| 8,246,112 B2 * | 8/2012 | Yasuda | .................. | B60N 2/838 297/216.12 |
| 8,616,634 B2 * | 12/2013 | Yasuda | ................ | B60N 2/4228 297/216.12 |
| 8,926,020 B2 * | 1/2015 | Jeong, II | ................ | B60N 2/829 297/408 |
| 9,145,078 B2 * | 9/2015 | Locke | ....................... | B60N 2/22 |
| 9,789,794 B1 * | 10/2017 | Roychoudhury | ...... | B60N 2/874 |
| 10,576,861 B1 * | 3/2020 | Medge | ................... | B60N 2/882 |
| 11,396,252 B2 * | 7/2022 | Nacy | ........................ | B60N 2/20 |

(Continued)

FOREIGN PATENT DOCUMENTS

WO       2010017801 A1     2/2010

*Primary Examiner* — Shin H Kim
(74) *Attorney, Agent, or Firm* — CANTOR COLBURN LLP

(57) ABSTRACT

An energy absorbing headrest for a vehicle includes a base member, a frame pivotally mounted to the base member, and a biasing member mounted between the base member and the frame. The biasing member provides a biasing force to the frame. A release mechanism is mounted to the base member and retains the frame against the biasing force. The release mechanism selectively releases the frame upon receipt of a release signal.

14 Claims, 3 Drawing Sheets

(56) References Cited

U.S. PATENT DOCUMENTS

| | | | |
|---|---|---|---|
| 2001/0037904 A1* | 11/2001 | Breed ................ | B60N 2/02246 |
| | | | 177/144 |
| 2004/0017099 A1* | 1/2004 | O'Connor .............. | B60N 2/862 |
| | | | 297/61 |
| 2006/0071518 A1 | 4/2006 | Hippel | |
| 2007/0085400 A1* | 4/2007 | Terada ................... | B60N 2/888 |
| | | | 297/391 |
| 2008/0265637 A1 | 10/2008 | Niitsuma | |
| 2010/0017801 A1 | 1/2010 | Kundapur | |
| 2010/0181810 A1* | 7/2010 | Yasuda .................. | B60N 2/838 |
| | | | 297/216.12 |
| 2010/0270835 A1* | 10/2010 | Nitsuma ............... | B60N 2/888 |
| | | | 297/216.12 |
| 2012/0222511 A1* | 9/2012 | Jeong .................... | B60N 2/835 |
| | | | 74/22 A |
| 2012/0299343 A1* | 11/2012 | Yasuda ............... | B60N 2/4228 |
| | | | 297/216.12 |
| 2023/0044679 A1* | 2/2023 | Jung ....................... | B60N 2/68 |

* cited by examiner

ENERGY ABSORBING HEADREST FOR A VEHICLE

INTRODUCTION

The subject disclosure relates to the art of vehicles and, more particularly, to an energy absorbing headrest for a vehicle.

Vehicles include one or more seats. Each seat typically includes a seat base and a seatback. In some cases, the seat base may take the form of a bench. The seatback supports a headrest that limits rearward travel or excursions of a driver's/passenger's head during a rear end collision. The headrest may be vertically height adjustable to accommodate a wide range of users. Certain headrests may also be forward/aft adjustable. Once in position, the headrest limits rearward head excursions when the vehicle is subjected to rear end originated acceleration forces.

When the vehicle is exposed to rear end originated acceleration forces, a user's head moves backward and into contact with the head rest. The headrest includes padding, often in the form of foam, that absorbs energy imparted by the user's head. While effective, the energy absorbing capabilities are limited. Enhancing energy absorbing capacity of a headrest will further limit user injury. Accordingly, it is desirable to provide a headrest with enhanced energy absorbing capabilities.

SUMMARY

In a non-limiting example, an energy absorbing headrest for a vehicle includes a base member, a frame pivotally mounted to the base member, and a biasing member mounted between the base member and the frame. The biasing member provides a biasing force to the frame. A release mechanism is mounted to the base member and retains the frame against the biasing force. The release mechanism selectively releases the frame upon receipt of a release signal.

In addition to one or more of the features described herein a travel limiter is mounted to the base, the travel limiter constraining motion of the frame provided by the biasing force.

In addition to one or more of the features described herein the travel limiter is formed from a resilient material.

In addition to one or more of the features described herein the resilient material comprises rubber.

In addition to one or more of the features described herein the frame includes a release engagement member that interacts with the release mechanism to constrain movement of the frame.

In addition to one or more of the features described herein the frame includes a base portion, a top portion, a first side portion, and a second side portion, the first side portion and the second side portion extending between and being connected to the base portion and the top portion.

In addition to one or more of the features described herein a support element extends between the first side portion and the second side portion, the support element being spaced from the top portion and the base portion, the release engagement member being mounted to the support element.

In addition to one or more of the features described herein the release mechanism comprises a solenoid.

In addition to one or more of the features described herein the biasing member comprises a double torsion spring.

In another non-limiting example, a vehicle includes a body defining a passenger compartment, a plurality of wheels supporting the body, and a seat mounted in the passenger compartment. The seat includes a seatback supporting an energy absorbing headrest. The energy absorbing headrest includes a base member, a frame pivotally mounted to the base member, and a biasing member mounted between the base member and the frame. The biasing member provides a biasing force to the frame. A release mechanism is mounted to the base member and retains the frame against the biasing force. The release mechanism selectively releases the frame upon receipt of a release signal.

In addition to one or more of the features described herein a travel limiter is mounted to the base, the travel limiter constraining motion of the frame provided by the biasing force.

In addition to one or more of the features described herein the travel limiter is formed from a resilient material.

In addition to one or more of the features described herein the resilient material comprises rubber.

In addition to one or more of the features described herein the frame includes a release engagement member that interacts with the release mechanism to constrain movement of the frame.

In addition to one or more of the features described herein the frame includes a base portion, a top portion, a first side portion, and a second side portion, the first side portion and the second side portion extending between and being connected to the base portion and the top portion.

In addition to one or more of the features described herein a support element extends between the first side portion and the second side portion, the support element being spaced from the top portion and the base portion, the release engagement member being mounted to the support element.

In addition to one or more of the features described herein the release mechanism comprises a solenoid.

In addition to one or more of the features described herein the biasing member comprises a double torsion spring.

In addition to one or more of the features described herein a sensor is mounted in the body, the sensor being configured to detect accelerations at a rear end of the body.

In addition to one or more of the features described herein a controller is coupled to the sensor and the release mechanism, the controller activating the release mechanism upon detection of accelerations at the rear end of the body.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
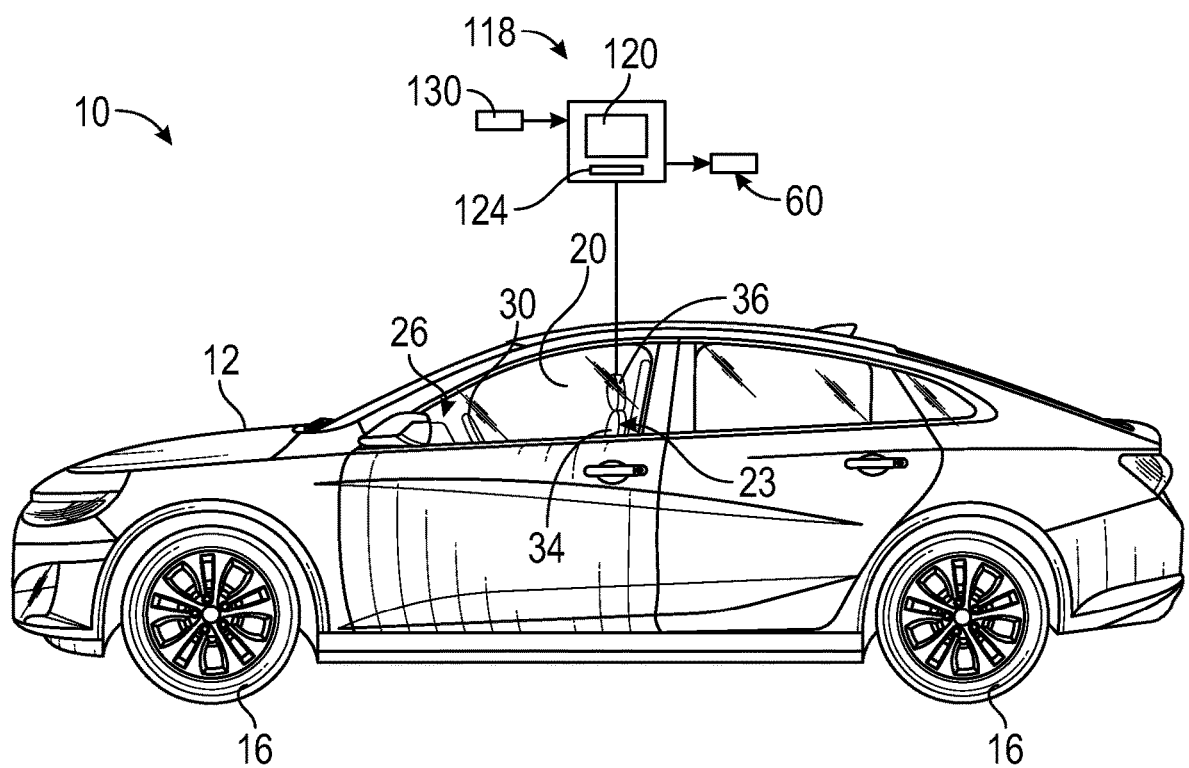
FIG. 1 is a side view of a vehicle including an energy absorbing headrest, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. At least one of the plurality of wheels 16 is a steerable wheel. That is, changing a position of at least the one of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
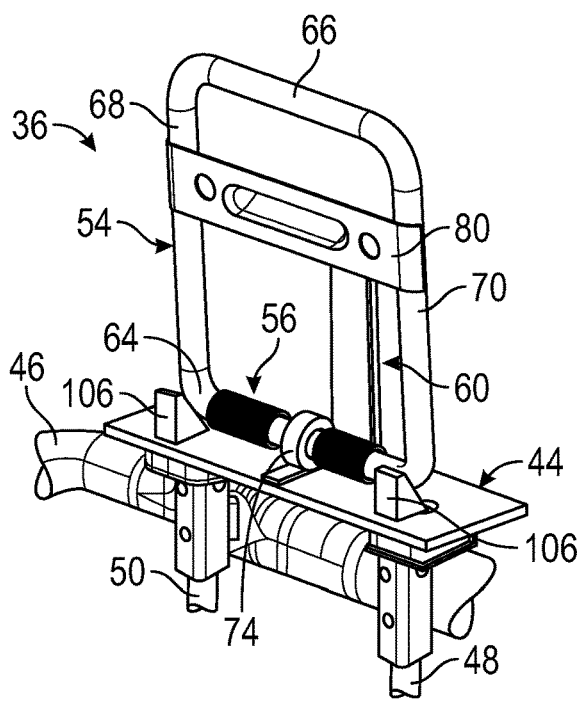
FIG. 2 is a left side partial perspective view of the energy absorbing headrest of FIG. 1 without external covering, in accordance with a non-limiting example.
Figure 3:
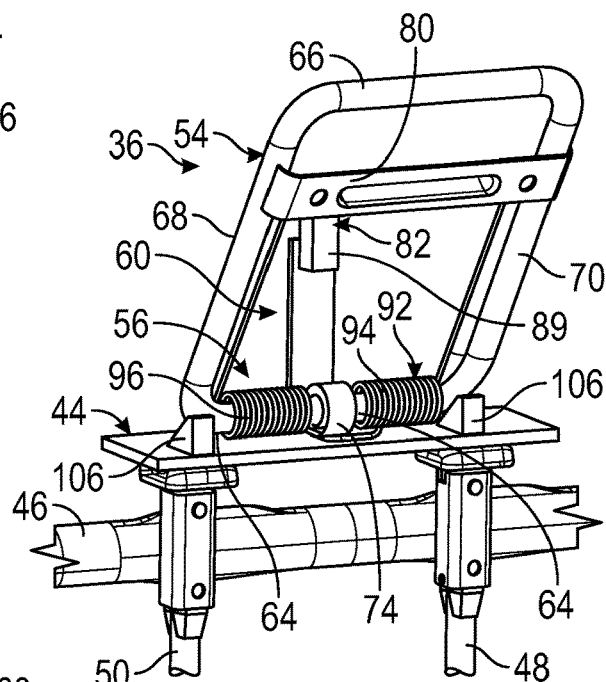
FIG. 3 is a right side partial perspective view of the energy absorbing headrest of FIG. 2 in a deployed configuration, in accordance with a non-limiting example.
Figure 4:
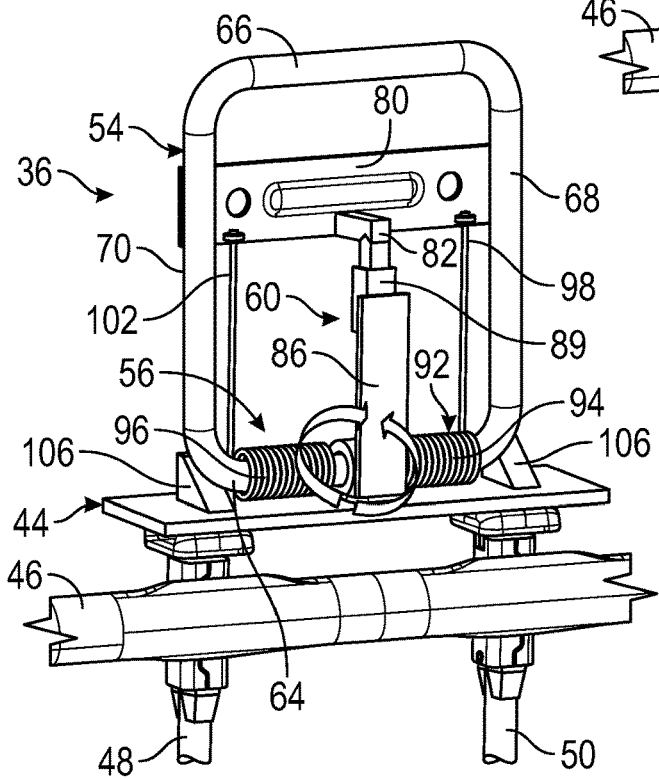
FIG. 4 is a rear partial perspective view of the energy absorbing headrest of FIG. 2, in accordance with a non-limiting example.

In a non-limiting example, seat 23 includes a seatback 34 which supports an energy absorbing headrest 36. Referring to FIGS. 2-4, energy absorbing headrest 36 includes a base member 44 coupled to a support member 46. Support member 46 may take the form of a structural portion of seatback 34. Base member 44 supports a first adjustment member 48 and a second adjustment member 50. First adjustment member 48 and second adjustment member 50 extend into seatback 34 and provide vertical height adjustment for energy absorbing headrest 36. A frame 54 is pivotally connected to base member 44. A biasing member 56 is coupled between base member 44 and frame 54. A release mechanism 60 selectively retains frame 54 against a biasing force provided by biasing member 56.

Frame 54 includes a base portion 64, a top portion 66, a first side portion 68, and a second side portion 70. A pad 72 (FIG. 5) is supported by frame 54. A coupler 74 connects base portion 64 to base member 44. Coupler 74 constrains base portion 64 to base member 44 while, at the same time, allows frame 54 to rotate or pivot. A support element 80 extends between first side portion 68 and second side portion 70. Support element 80 is spaced from base portion 64 and top portion 66. Support element 80 is closer to top portion 66 than to base portion 64. At this point, it should be understood that frame 54, biasing member 56, release mechanism 60, and pad 72 may be shrouded by a protective cover (not shown).

In a non-limiting example, a release engagement member 82 is provided on support element 80. Release engagement member 82 is centrally spaced between first side portion 68 and second side portion 70 in a non-limiting example. A release support 86 projects from base member 44. Release mechanism 60 is coupled to release support 86 and selectively engages release engagement member 82. Release mechanism 60 takes the form of a solenoid 89 that secures frame 54 against the biasing force provided by biasing member 56. Solenoid 89 selectively releases release engagement member 82 allowing frame 54 to pivot in response to forces provided by biasing member 56.

In a non-limiting example, biasing member 56 takes the form of a double torsion spring 92 including a first torsion spring member 94 and a second torsion spring member 96. First torsion spring member 94 and second torsion spring member 96 are mounted on base portion 64. In further accordance with a non-limiting example, first torsion spring member 94 is mounted to base portion 64 between coupler 74 and first side portion 68 and second torsion spring member 96 is mounted to base portion 64 between coupler 74 and second side portion 70.

Figure 5:
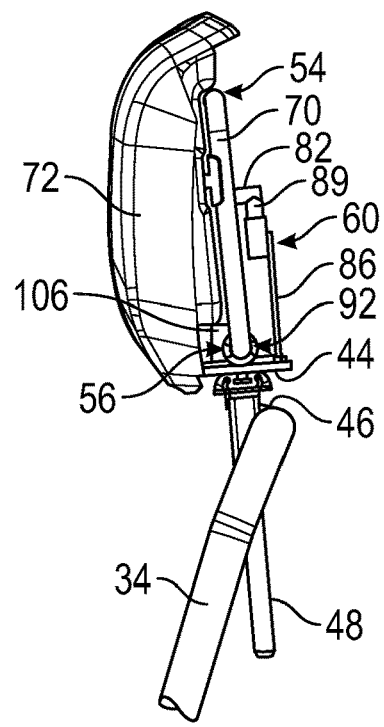
FIG. 5 is a side view of the energy absorbing headrest of FIG. 2, in a non-deployed configuration, accordance with a non-limiting example.
Figure 6:
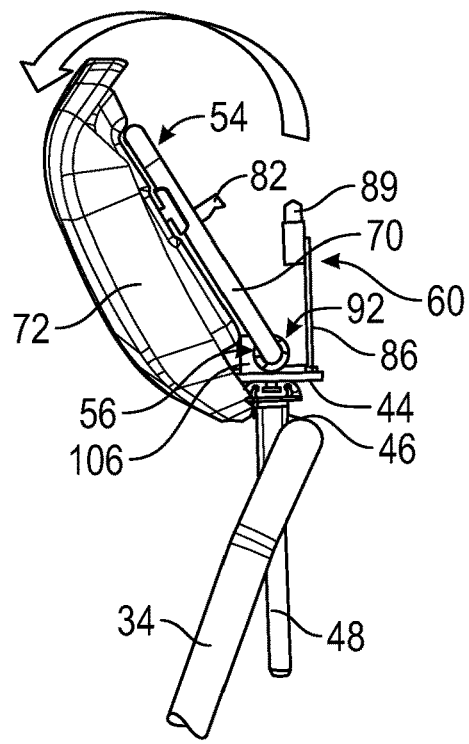
FIG. 6 is a side view of the energy absorbing headrest of FIG. 3 in a deployed configuration, in accordance with a non-limiting example.

Double torsion spring 92 drives frame 54 forward from a restrained configuration such as shown in FIGS. 2 and 5 to a released configuration such as shown in FIGS. 3 and 6 in a direction toward, for example, dashboard 26 when vehicle 10 is exposed to acceleration forces on a rear portion (not separately labeled) of body 12. Forward movement of frame 54 is constrained by a pair of travel limiters indicated at 106 mounted to base member 44. Each travel limiter 106 is formed from a resilient material such as rubber. In addition to driving frame 54 forward, double torsion spring 92 also cushions a rearwardly directed movement of a user's head so as to absorb energy from the acceleration forces and mitigate possible injury.

Release mechanism 60 is connected to a controller 118, FIG. 1. Controller 118 includes a headrest release module 120 that selectively activates release mechanism 60 and a non-volatile memory 124. Controller 118 is also connected to a sensor 130 and is positioned to perceive the acceleration forces directed at a rear end or rear portion (not separately labeled) of body 12. Headrest release module 120 activates release mechanism 60 based on a set of instructions stored in non-volatile memory 124. At this point, it should be understood that while shown as being integrated into a single controller 118, headrest release module 120 and non-volatile memory 124 may be integrated into various vehicle systems.

In a non-limiting example, when vehicle 10 is exposed to forwardly directed acceleration forces directed onto the rear end or rear portion of body 12, headrest release module 120 signals release mechanism 60 to activate allowing frame 54 to travel forwardly toward travel limiter 106. The forward movement of frame 54 reduces unrestrained movement distance of the user's head. Once frame 54 contacts travel limiter 106, the user's head may contact pad 72 on energy absorbing headrest 36 and begin to travel rearwardly. The speed and energy associated with the rearward movement is reduced by a re-loading of double torsion spring 92.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An energy absorbing headrest for a vehicle comprising:
a base member;
a frame pivotally mounted to the base member;

a biasing member mounted between the base member and the frame, the biasing member providing a biasing force to the frame;

a travel limiter formed from a resilient material mounted to the base, the travel limiter constraining motion of the frame provided by the biasing force;

a release mechanism mounted to the base member and retaining the frame against the biasing force, the release mechanism selectively releasing the frame upon receipt of a release signal; and a controller operatively connected to the release mechanism, the controller being operable to issue the release signal in response to detecting an external force on the vehicle.

2. The energy absorbing headrest according to claim 1, wherein the resilient material comprises rubber.

3. The energy absorbing headrest according to claim 1, wherein the release mechanism comprises a solenoid.

4. The energy absorbing headrest according to claim 1, wherein the biasing member comprises a double torsion spring.

5. An energy absorbing headrest for a vehicle comprising:
a base member;
a frame pivotally mounted to the base member, wherein the frame includes a base portion, a top portion, a first side portion, and a second side portion, the first side portion and the second side portion extending between and being connected to the base portion and the top portion, the frame including a release engagement member that interacts with the release mechanism to constrain movement of the frame;
a biasing member mounted between the base member and the frame, the biasing member providing a biasing force to the frame;
a release mechanism mounted to the base member and retaining the frame against the biasing force, the release mechanism selectively releasing the frame upon receipt of a release signal; and
a controller operatively connected to the release mechanism, the controller being operable to issue the release signal in response to detecting an external force on the vehicle.

6. The energy absorbing headrest according to claim 5, further comprising a support element extending between the first side portion and the second side portion, the support element being spaced from the top portion and the base portion, the release engagement member being mounted to the support element.

7. A vehicle comprising:
a body defining a passenger compartment;
a plurality of wheels supporting the body; and
a seat mounted in the passenger compartment, the seat including a seatback supporting an energy absorbing headrest, the energy absorbing headrest comprising:
a base member;
a frame pivotally mounted to the base member;
a biasing member mounted between the base member and the frame, the biasing member providing a biasing force to the frame;
a travel limiter formed from a resilient material mounted to the base, the travel limiter constraining motion of the frame provided by the biasing force;
a release mechanism mounted to the base member and retaining the frame against the biasing force, the release mechanism selectively releasing the frame upon receipt of a release signal; and
a controller operatively connected to the release mechanism, the controller being operable to issue the release signal in response to detecting an external force on the vehicle.

8. The vehicle according to claim 7, wherein the resilient material comprises rubber.

9. The vehicle according to claim 7, wherein the frame includes a release engagement member that interacts with the release mechanism to constrain movement of the frame.

10. The vehicle according to claim 9, wherein the frame includes a base portion, a top portion, a first side portion, and a second side portion, the first side portion and the second side portion extending between and being connected to the base portion and the top portion.

11. The vehicle according to claim 10, further comprising a support element extending between the first side portion and the second side portion, the support element being spaced from the top portion and the base portion, the release engagement member being mounted to the support element.

12. The vehicle according to claim 7, wherein the release mechanism comprises a solenoid.

13. The vehicle according to claim 7, wherein the biasing member comprises a double torsion spring.

14. The vehicle according to claim 7, further comprising a sensor mounted in the body, the sensor being operatively connected to the controller, the sensor being configured to detect the external force on the vehicle in the form of accelerations at a rear end of the body.

* * * * *